United States Patent [19]

Dobhan et al.

[11] Patent Number: 4,580,757

[45] Date of Patent: Apr. 8, 1986

[54] APPARATUS FOR MOLDING A ROLLER WITH BEARINGS

[75] Inventors: Herbert Dobhan, Bergrheinfeld; Elmar Kaiser; Bruno Schemmel, both of Geldersheim; Hilmar Leuner, Uchtelhausen; Werner Schneider, Stadtlauringen; Manfred Brandenstein, Eussenheim; Oskar Bretscher, Theinfeld, all of Fed. Rep. of Germany

[73] Assignee: SKF Kugellagerfabriken GmbH, Schweinfurt, Fed. Rep. of Germany

[21] Appl. No.: 663,936

[22] Filed: Oct. 23, 1984

[30] Foreign Application Priority Data

Oct. 29, 1983 [DE] Fed. Rep. of Germany ....... 3339355

[51] Int. Cl.[4] ............... B29C 33/00; B29C 33/76
[52] U.S. Cl. ................................ 249/88; 425/117
[58] Field of Search ............ 249/83, 88; 425/110, 425/116, 117, 129 R

[56] References Cited

U.S. PATENT DOCUMENTS 2,724,864 11/1955 Krotz ........................... 249/83
3,941,495 3/1976 Duncan ...................... 425/129 R
4,167,379 9/1979 Liautaud ........................ 249/83

Primary Examiner—Willard E. Hoag
Attorney, Agent, or Firm—Yuter, Rosen & Dainow

[57] ABSTRACT

Apparatus for making a molded plastic roller with embedded bearings. The roller is formed directly on a bearing or the like by injecting plastic into a mold by way of an umbrella sprue. The tool parts are arranged so that the shearing surface, formed after shearing off of the sprue residue when the mold is opened, is located on the outer surface of the inner collar portion. The molding tool comprises two tool parts for forming the outer surfaces of the rolling body, at least one tool part having a molding portion for forming an annular recess in the roller, and a cylindrical tool part inserted in the bearing, or the like and having a mushroom-shaped head. A back taper of the molding portion for forming the annular recess and the edge of the head together define an annular clearance through which plastic material is injected. The head has a planar surface which covers the bearing or the like and serves as the molding surface for the sides of the inner collar portion, and a spherical surface for defining the umbrella sprue.

5 Claims, 3 Drawing Figures

APPARATUS FOR MOLDING A ROLLER WITH BEARINGS

FIELD OF THE INVENTION

The invention relates to a roller and an apparatus for forming the roller directly on a ball bearing by injection molding.

BACKGROUND OF THE INVENTION

A roller of the above-described type is disclosed, for example, in DE-GM No. 8214741. A rolling bearing is encompassed by a rolling body, the front side of which is closed by the bearing and the other side of which is provided with annular recesses. When this rolling body is to be injection-molded directly onto the outer ring of the bearing, an umbrella sprue is used because of the known satisfactory results of this method of injection molding. However, because the sprue is always directed axially, difficulties arise when the side faces of the bearing rings and the interposed bearing frame are without engagement. Furthermore, an annular sprue residue is formed on the side face of the inner wall portion, which must be removed in a subsequent process step if the side face must be flat due to operating conditions and, for example, flush with the outer ring.

A similar umbrella sprue is, for example, schematically depicted in FIG. 40 of Kunststoff-Taschenbuch by Sachtling, Issue 21, page 97. In the bore of the injection-molded workpiece a tool part must be inserted which at the same time forms the inner mold for the umbrella sprue by means of its conical side face. Likewise, when a hub or the like is to be injection-molded, finishing of the side face is necessary after shearing off of the umbrella sprue, in the case when the side face is to be utilized, for example, as an abutment face. This is also true for the radial vent shown in FIGS. 3-6 on page 19 of *Maschinen-elemente aus thermoplastischen Kunststoffen, Grundlagen und Verbindungselemente* by Erhard and Strickle. The umbrella sprue is formed on the side face of the inner wall portion. A tool is not shown in this figure.

SUMMARY OF THE INVENTION

The object of the invention is to provide a roller of the above-described type which is injection-molded directly onto a prefabricated hub, bearing or the like by means of a corresponding tool by using an umbrella sprue whereby subsequent finishing of the side surfaces of the roller is not necessary.

This object is achieved by means of a molding tool for forming the roller whereby the shearing surface of the sprue residue is arranged on the outer surface of the inner collar portion. The molding tool includes a separately adjustable, cylindrical tool part provided with a mushroom-shaped head which covers the side face of the hub, bearing or the like and which serves as the molding surface for forming the side face of the inner collar portion of the rolling body.

By this means the entire inner side face of the roller is covered, whereby on the one hand the injected material cannot flow into the area of the hub, bearing or the like, which is a particular advantage with respect to roller bearings, and on the other hand a precise continuous mold surface for formation of the inner side face of the roller sleeve is provided. This renders the step of refinishing this portion of the roller sleeve unnecessary. Since the sprue is arranged at a location corresponding to the outer surface of the inner collar portion, i.e., on the inside of the annular recess, any irregularities formed at that location as a result of opening of the mold need not be removed by the conventional refinishing operation. A novel and advantageous construction of molding tool parts makes possible the umbrella sprue of the present invention. The mushroom-shaped head of the cylindrical tool part together with the tool part which forms the annular recess in the area of the sprue define an annular clearance, which, for example, is arranged in the peripheral zone but on the outer surface of the inner collar portion. After the solidification of the injected material the tool parts are separated, during which the annular sprue is automatically sheared off by the circumferential edge of the mushroom-shaped head. Thus, during opening of the mold, a small sprue residue is left on the outer surface of the inner collar portion of the rolling body, as a result of which a further reworking of the rolling body surface is not necessary.

In accordance with a further feature of the invention, the outer diameter of the mushroom-shaped head is equal to or slightly smaller than the inner diameter of the tool part which forms the annular recess in the area of the sprue. The adjustment of the diameters in relation to each other determines the residual amount of sprue left, i.e. the quality of the shearing surface, after the mold is opened.

The preferred embodiment of the invention further comprises a tool part for forming the annular recess, this tool part being provided with a radially outwardly directed back taper and defining, together with the periphery of the mushroom-shaped head, an essentially radially inwardly directed or conical inclined annular clearance for the admission of injected material. The depth of the back taper can be advantageously selected for determining the thickness of the injected stream. Furthermore, it is possible to vary the inflow direction of the injected material by proper selection of the angle of inclination of the back taper. This is particularly important for achieving the proper distribution and density of the injected material in the assembled molding tool.

In accordance with a further preferred embodiment, the periphery of the mushroom-shaped head has a narrow cylindrical surface and the side face of the head is provided with a central pocket bore of small depth. By means of the cylindrical surface, the amount of turbulence in the zone of deflection of the flow of injected material is reduced, whereby the filling of the molding tool is enhanced. The object of the central pocket bore is to capture solidified injection material which remains in the supply channel, thereby preventing passage of solidified material into the molding tool.

BRIEF DESCRIPTION OF THE DRAWINGS

The preferred embodiment of the invention is described in detail with reference to the following drawings, wherein.

DETAILED DESCRIPTION OF THE PREFERRED EMBODIMENT

Figure 1:
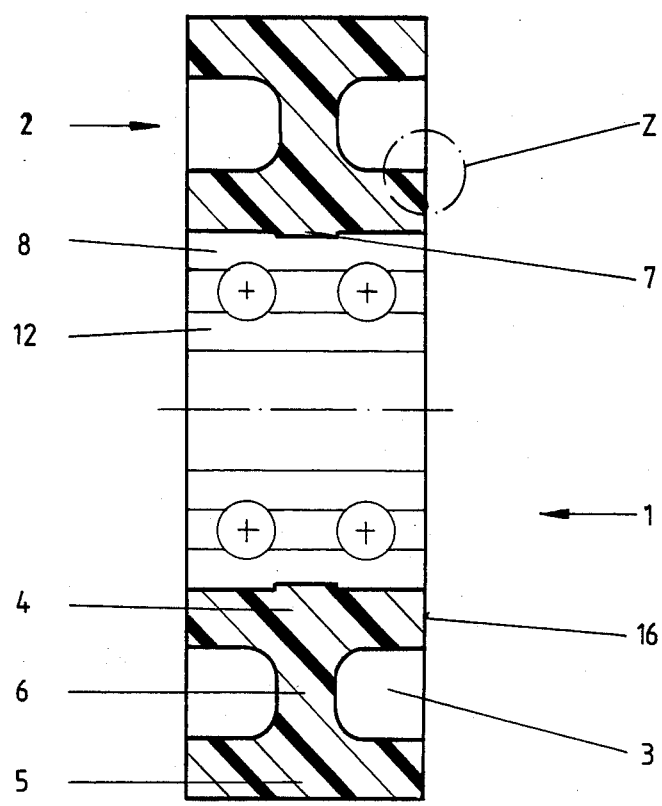
FIG. 1 is a longitudinal section of a roller produced by means of an umbrella sprue.

The roller depicted in FIG. 1 comprises a double-row ball bearing 1 and a rolling body 2 made of plastic. Rolling body 2 has annular recesses on both sides, defined by an inner collar portion 4, a roller sleeve 5 and an annular portion 6 connecting the collar portion 4 and the roller sleeve 5. The rolling body 2 is formed directly on the ball bearing 1 by injection molding and is axially secured on the bearing by means of an annular groove 7 in the outer ring 8.

Figure 3:
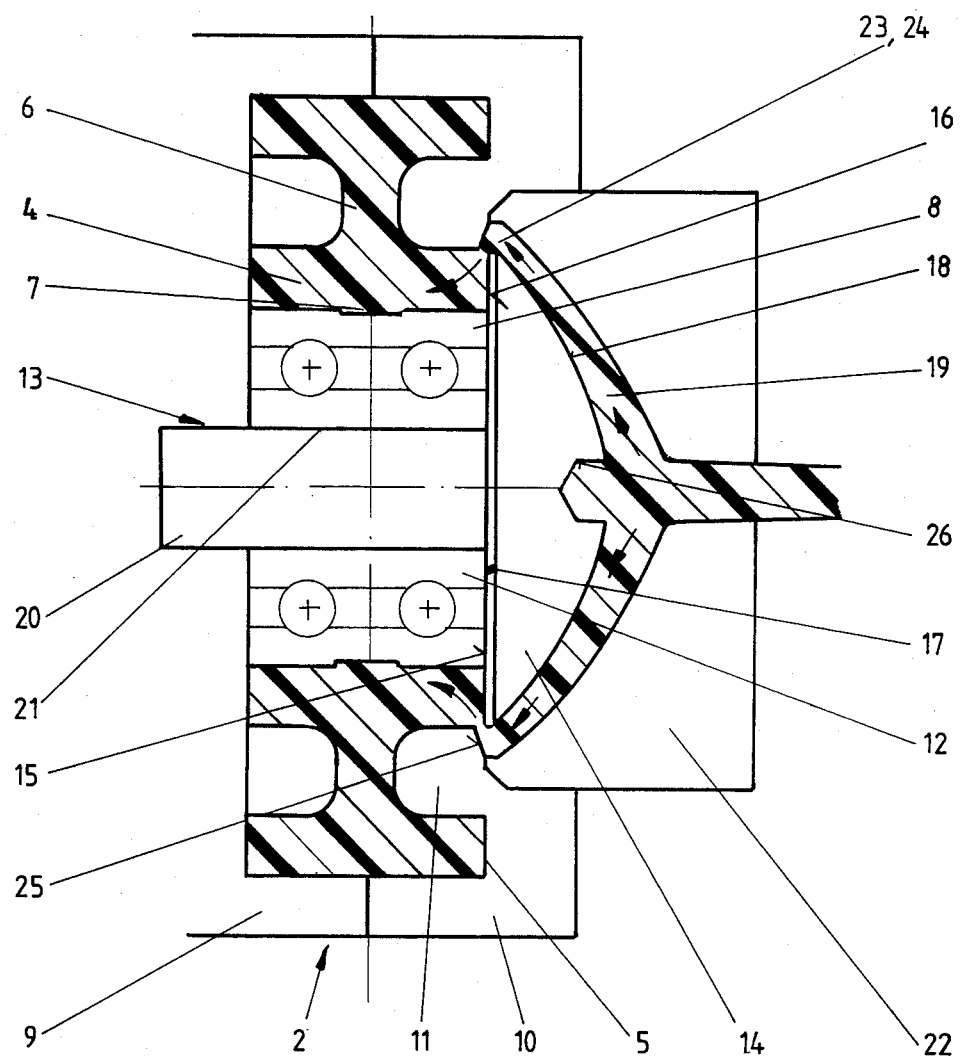
FIG. 3 is a longitudinal section of a molding tool for the production of the roller shown in FIG. 1.

FIG. 3 depicts the injection molding process in which the rolling body is formed by injection directly on ball bearing 1 in a molding tool by means of an umbrella sprue. In this illustration the molding tool is schematically depicted and only essential elements are shown. The molding tool essentially comprises two axially movable, dish-shaped tool parts 9, 10 with a junction plane approximately in the axial center of the roller to be formed between the tool parts.

These tool parts 9, 10 also have the portion 11 for formation of the annular recess 3. A cylindrical tool part 13 with a mushroom-shaped head 14 is inserted in the bore of the inner ring 12 of ball bearing 1. The planar radial surface 15 of head 14 covers one side of ball bearing 1 and serves as a bounding mold face for the entire side face 16 of inner collar portion 4 of rolling body 2. The peripheral area of the head 14 has a narrow cylindrical surface 17, the diameter of which is negligibly smaller, i.e., by about 0.1 mm, than the inner diameter of portion 11 for formation of the annular recess 3. The side face 18 of head 14 is spherical and forms the inner mold for the umbrella sprue 19. The shaft 20 of the cylindrical tool part 13 in the inserted position extends beyond the other side face of inner ring 12 and is centered in a corresponding bore 21 of the dish-shaped tool part 9. The outer surface of the umbrella sprue 19 is formed by an accessory tool part 22 which is centered in tool part 10.

When the entire mold tool (as shown in FIG. 3) is installed in the working position, an umbrella-shaped sprue space is formed which is narrowed in the peripheral region. The injected material flows uniformly through the umbrella sprue in a radially outward direction, which flow is deflected into the chamber formed by tool parts 9, 10 by means of a conical surface 25 formed as a back taper of portion 11. This deflecting surface 25, along with the narrow cylindrical surface 17, defines a conical, radially inwardly sloping annular clearance 23 through which injected material passes in the form of a stream, which solidifies in the sprue after filling of the mold, thereby forming sprue residue 24. The cylindrical surface 17 of the mushroom-shaped head 14 promotes the unhindered flow of injected material into the deflection zone. The flow direction of the injected material is depicted by arrows in FIG. 3. The mushroom-shaped head 14 is provided with a central pocket bore 26 for the capture of solidified injection material remaining in the supply channel from the previous cycle.

When the mold is opened, the cylindrical tool part 13 with the mushroom-shaped head 14 remains in the tool part 9 and holds the injection-molded roller in place. The other tool part 10 is removed axially together with the accessory tool 22, whereby the sprue residue 24 in the area of the annular clearance 23 is sheared off. As mentioned previously, the diameter of the mushroom-shaped head 14 is slightly smaller than that of the inner surface of portion 11 of tool part 10, so that upon opening of the mold, no snags arise during shearing off of the sprue residue. The umbrella sprue, which is likewise formed by solidification, can then be pushed out of accessory tool 22. When the cylindrical tool part 13 is removed from the bore of inner ring 12 as well as from the tool part 9, the finished roller can be removed from the tool part 9.

Figure 2:
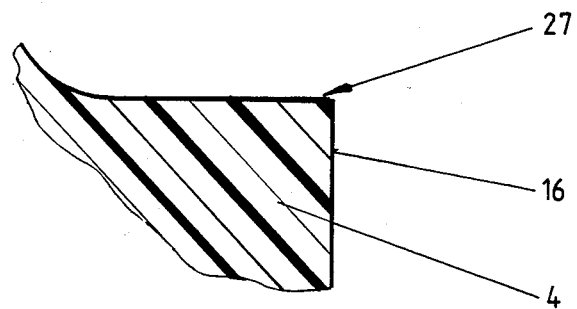
FIG. 2 is an enlarged detailed view of the area encompassed by circle Z in FIG. 1.

In accordance with the above-described arrangement, the stream of injected material enters the mold tool at a place corresponding to the surface of the inner collar portion 4 (as depicted in FIGS. 1 and 2), as a result of which the side face 16 of inner collar portion 4 is free of surface irregularities arising from shearing off of the sprue residue. Following the shearing action of tool parts 10 and 14, a narrow annular surface 27 (see FIG. 2) remains on the outer surface of the inner collar portion 4 which is rough relative to the adjacent molded surface, yet provides a geometrically and aesthetically satisfactory surface.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

We claim:

1. In a molding tool for the manufacture by injection molding with plastic material of a rolling body directly on a bearing by means of an umbrella sprue, said rolling body having an annular recess formed on the front side thereof and an inner collar portion, comprising first and second tool parts for forming the outer surfaces of said rolling body, an essentially cylindrical tool part inserted in the bore of said bearing or the like, the improvement wherein said cylindrical tool part comprises a mushroom-shaped head having a planar surface which covers the side faces of said bearing, and defines the molding surface for forming the side faces of said inner collar portion, and having a substantially spherical surface for defining said umbrella sprue.

2. A molding tool as defined in claim 1 wherein said first tool part includes means for forming said annular recess, the outer diameter of said mushroom-shaped head being equal to or slightly less than the inner diameter of said means for forming said annular recess.

3. A molding tool as defined in claim 1 wherein said means for forming said annular recess is provided with a radially outwardly directed, annular back taper in the area of said sprue, said back taper forming together with the circumferential edge of said mushroom-shaped head a radially inwardly directed, conically sloped annular clearance for the injection of plastic material.

4. A molding tool as defined in claim 3, wherein said circumferential edge of said mushroom-shaped head comprises a narrow cylindrical surface.

5. A molding tool as defined in claim 1 wherein said substantially spherical surface of said head has a central pocket bore of small depth formed therein.

* * * * *